United States Patent
Axtner et al.

(10) Patent No.: US 11,973,204 B2
(45) Date of Patent: Apr. 30, 2024

(54) METHOD AND DEVICE FOR PRODUCING A HEAT TRANSFER OF COMPONENTS OF A BATTERY

(71) Applicant: Lisa Draexlmaier GmbH, Vilsbiburg (DE)

(72) Inventors: Ralf Axtner, Grafing (DE); Matthias Metzelthin, Wurmsham (DE)

(73) Assignee: LISA DRÄXLMAIER GMBH, Vilsbiburg (DE)

( * ) Notice: Subject to any disclaimer, the term of this patent is extended or adjusted under 35 U.S.C. 154(b) by 405 days.

(21) Appl. No.: 17/148,606

(22) Filed: Jan. 14, 2021

(65) Prior Publication Data

US 2021/0226277 A1  Jul. 22, 2021

(30) Foreign Application Priority Data

Jan. 16, 2020 (DE) .......................... 102020100898.8

(51) Int. Cl.
- *H01M 10/653* (2014.01)
- *H01M 10/04* (2006.01)
- *H01M 10/613* (2014.01)
- *H01M 50/204* (2021.01)
- *H01M 50/264* (2021.01)

(52) U.S. Cl.
CPC ..... *H01M 10/653* (2015.04); *H01M 10/0404* (2013.01); *H01M 10/613* (2015.04); *H01M 50/204* (2021.01); *H01M 50/264* (2021.01); *H01M 2220/20* (2013.01)

(58) Field of Classification Search
CPC ............. H01M 10/653; H01M 10/613; H01M 10/0404; H01M 50/264; H01M 50/204; H01M 2220/20
See application file for complete search history.

(56) References Cited

FOREIGN PATENT DOCUMENTS

| DE | 102012222133 A1 | 6/2014 |
|---|---|---|
| DE | 102014119357 A1 | 6/2016 |
| DE | 102018210819 A1 | 1/2020 |

OTHER PUBLICATIONS

English Langauge Translation of the Abstract of DE 102018210819 A1.
English Langauge Translation of the Abstract of DE 102012222133A1.
English Langauge Translation of the Abstract of DE 102014119357A1.
Office Action from the German Patent Office for German Patent Application DE 102020100898.8 to Lisa Dräxlmaier GmbH, dated Aug. 5, 2020.
Ottozeus.de glossary for word Rupenauftrag, dated Jul. 30, 2020.

*Primary Examiner* — James Lee
(74) *Attorney, Agent, or Firm* — BelayIP

(57) ABSTRACT

The present disclosure relates to a method for producing a heat transfer between a base plate and at least one cell module of a battery, wherein the base plate of a frame of the battery is placed on a vacuum cushion, the vacuum cushion is plastically molded and a negative pressure is generated in the vacuum cushion in order to harden the vacuum cushion, then the cell module of the battery is pressed into a thermal paste previously applied to a surface of at least one of the base plate and the cell module, while the base plate is supported substantially over the entire surface by the hardened vacuum cushion, wherein the thermal paste is laterally distributed between the cell module and the base plate.

8 Claims, 2 Drawing Sheets

METHOD AND DEVICE FOR PRODUCING A HEAT TRANSFER OF COMPONENTS OF A BATTERY

CROSS REFERENCE TO RELATED APPLICATIONS

This application is claims priority to German Patent Application No. 10 2020 100 898.8, filed on Jan. 16, 2020, the content of both of which is incorporated herein by reference.

BACKGROUND OF THE INVENTION

The present invention relates to a method and a corresponding device for connecting components of a battery.

A battery can be composed of several components. One of the components may be a frame or battery housing of the battery. Another component of the battery can be one or more cell modules of the battery. A cell module can be composed of several cells. Heat is generated when the cells are charged and discharged. This heat can be dissipated via a cooling device as another component of the battery. For example, the cooling device may be connected to a cooling surface of the cell module. For bonding, a thermal paste can be placed between the cooling device and the cell module.

BRIEF SUMMARY OF THE INVENTION

It is therefore a purpose of the invention to provide an improved method and an improved device for producing a heat transfer of components of a battery, using means which are as simple as possible in terms of construction.

The task is solved by the objects of the independent claims. Advantageous embodiments of the invention are disclosed in the dependent claims, the description and the accompanying figures. In particular, the independent claims of one category of claims may also be further developed in a manner analogous to the dependent claims of another category of claims.

The invention relates to a method for producing a heat transfer between the components of a battery, where the first component is a base sheet of a frame of the battery placed on a vacuum cushion and plastically shaped by the vacuum cushion and then a vacuum is generated in the vacuum cushion in order to harden the vacuum cushion, where, as the second component, at least one cell module of the battery is pressed into a heat-conducting paste previously applied to a surface of at least one of the components, while the bottom sheet is supported substantially over the entire surface by the hardened vacuum cushion, the heat conducting paste is distributed laterally between the cell module and the floor plate.

A battery in the sense of the present invention may be a chemical storage device for electrical energy. For example, the battery may be a traction battery for an electrically powered vehicle. The battery may comprise a plurality of electrically interconnected cell modules. A cell module may be composed of a plurality of electrically interconnected prismatic cells. The cell module may be substantially cuboidal in shape. A frame of the battery may include spars joined substantially at right angles to form at least one compartment of the battery closed on one side by a base plate. A cell module can be arranged in a compartment. The base plate of the compartment may also be referred to as the bulkhead plate. The base plate can also be referred to as the cooling plate. On the vehicle, the frame can be attached to a body of the vehicle. The battery can be attached to an underbody of the vehicle. The base plate can be protected by a stone guard against flying stones when installed.

The cell module can be arranged on the base plate. Heat generated during charging and discharging of the cells can be dissipated via the base plate due to the chemical processes and electrical resistances taking place in the cells. Likewise, heat can be supplied to the cells via the base plate if the cells are too cold for the chemical processes. The base plate may be substantially shaped like a surface of the cell module. To reduce a heat transfer resistance and to compensate for manufacturing tolerances, heat conductive paste is placed between the cell module and the base plate. The thermal paste can also be referred to as a gap filler or gap filler paste. The thermal paste can be applied to the surface of the base plate before inserting the cell module into the compartment. Likewise, the thermal paste can be applied to the surface of the cell module before insertion. Alternatively, the thermal paste can be applied to the base plate and the cell module. The thermal paste can be chemically bonded and be permanently elastic, after application or pressure. The thermal paste may be a two-component material. Alternatively, the thermally conductive paste may be a single component material, may not set and may be permanently plastic, thus remain pasty substantially unchanged after application or pressure.

A vacuum cushion is plastically deformable under normal pressure. The deformability of the vacuum cushion corresponds in particular to the deformability of a cushion filled with a viscous or highly viscous liquid. When a vacuum is created in the vacuum cushion, the vacuum cushion hardens and becomes essentially solid. The filling of the vacuum cushion solidifies or partially solidifies when negative pressure is applied, as an ambient pressure acts on a cover of the vacuum cushion and the filling is compressed. The vacuum cushion can have a residual elasticity. The negative pressure can be generated by a vacuum pump. The vacuum pump can aspirate air out of the vacuum cushion. The negative pressure can be described as a vacuum. For example, the negative pressure can be between −0.05 bar and −0.9 bar.

When pressing the cell module into the thermal paste, the cell module can be pressed with a contact pressure. The contact pressure can be high enough to stimulate the highly viscous or pasty thermal paste to flow laterally by means of an internal hydraulic pressure. As a result of the lateral flow, the thermal paste is distributed in a gap between the cell module and the base plate and fills the gap substantially completely. The cell module can be pressed into the thermal paste in a force-controlled manner until the contact pressure reaches a predetermined value. The cell module may be pressed into the thermal paste until it is in contact with at least one point of the base plate. The cell module can also be pressed away into the thermal paste in a controlled manner, thus until a predetermined layer thickness of the thermal paste is reached between the cell module and the base plate. Due to the substantially full-surface support with the hardened cushion, the bottom sheet is substantially not deformed by the high hydraulic pressure locally generated in the thermal paste.

While the frame is lying on the vacuum cushion, further components of the battery can be mounted or further work steps for manufacturing the battery can be carried out.

The vacuum cushion may have an elastic cover and a filling of particles. The particles can be, for example, spheres. The balls can be made of a plastic material. The cover may, for example, consist of one or more layers of elastic film. Suitable materials for the flexible cover are PVC or PE films, which can be provided with a temperature-resistant coating, for example PTFE. When an internal pressure in the vacuum cushion is equal to or even slightly higher than an ambient pressure, the particles can easily slide off each other to form a contour of the base plate. By forming the contour of the base plate, the base plate can be supported in the vacuum cushion without stress or with low stress.

When the shell presses against the filling due to a pressure difference between the ambient pressure and the negative pressure, the particles are pressed against each other and can only be moved relative to each other by applying a large force. In particular, under negative pressure, a single particle is in contact with several other particles at the same time, whereby a very stable position can be achieved. With a strong negative pressure from approx. 0.3 to −0.4 bar, the cover can be pulled or pressed into spaces or recesses between the outermost particles of the filling, whereby the vacuum cushion can have a structured surface. The base plate is supported by a large number of contact points to the particles. Due to the small particles, the contact points have small distances to each other, which means that the base plate is essentially fully supported. Due to the structured surface, adhesion between the cover and the base plate can be reduced or prevented.

The vacuum cushion may have several separate chambers. In the chambers, different pressures can be set to adjust them to different degrees of tightness. A narrow gap can be formed between the chambers. For example, the base plate may not be supported above the gap. The base plate can be supported on the vacuum cushion with more than 90 percent of its surface. In particular, the base plate with more than 95 percent of its surface area can be supported on the vacuum cushion.

After pressing, an internal pressure of the vacuum cushion can be adjusted to an ambient pressure to soften the cushion. The frame can be lifted with the cell module from the softened cushion. By equalizing the pressure, the filling of the vacuum cushion can be easily deformed again. After the interconnected components have been lifted off, a next frame can be placed on the cushion and thus the procedure can be run again. The procedure can be carried out in a clocked manner. For example, a cycle time of two minutes can be aimed for.

The thermal paste can be applied in the form of caterpillar application. A spacing between the caterpillar of the caterpillar application may be substantially constant and the caterpillar may be flattened when pressed. The caterpillar in caterpillar application can be applied in a straight line and the caterpillar can be applied essentially in parallel. The space between the caterpillar can be filled by the thermal paste when pressed. By means of a flow movement of the thermal paste directed transversely to the caterpillar during pressing, an approximately full-surface wetting of both components with the thermal paste can be achieved. The caterpillars can be applied longitudinally or transversely to the cells of the cell module. In particular, the caterpillars can be applied across the cells. Air trapped between the caterpillars can escape between the individual cells of the cell module. Alternatively, the thermal paste may be applied by means of a spot or point application.

The thermal paste may be applied to at least a portion of the base plate. For example, the base plate may be larger than the cell module. To save weight, areas of the base plate between the spars and the cell module or between two cell modules can remain free of thermal paste. While the frame is lying on the vacuum cushion, the surface of the base plate can face upwards. The application of the thermal paste can thus be carried out particularly easily with the support of gravity.

A cooling device may be disposed between the base plate and the vacuum cushion. The cooling device can be plastically shaped by the vacuum cushion. A cooling device may have cooling channels for a coolant. The cooling channels may be arranged on a side of the base plate facing the vacuum cushion and may be pressed into the vacuum cushion when the cooling channels are placed. The cooling device can also be part of the base plate. The cooling device can also be placed on the base plate and glued to the base plate.

The cell module can be screwed to the frame after pressing. The cell module can be fixed to the frame by means of a screw connection. The screw connection can be made using a tolerance compensation element to compensate for shape and position tolerances during the screw connection process. This allows the cell module on the thermal paste to move within the tolerance, thus, to expand upon heating and contract upon cooling.

At least one other cell module of the battery can be pressed into the thermal paste. The thermal paste may be dispensed beforehand onto the further cell module and/or the base plate. The further cell module can be arranged in the same compartment of the frame as the first cell module. The further cell module can also be arranged in another compartment of the frame. Several cell modules can be installed in the same compartment. Several modules can be installed at the same time. For this purpose, a multiple gripper can be used, for example, which places all the cell modules to be installed at the same time together in the frame and presses them into the thermal paste. The cell modules can be arranged in a row within the compartment, for example. While the frame is lying on the vacuum cushion, several or all cell modules of the battery can be installed. A single cell module can also be installed per compartment. The spars can then separate the cell modules from each other, making it more difficult or even impossible for the damage to spread if the battery is damaged.

When pressing, a deflection of the base plate can be detected. The deflection can be detected by a recess in the vacuum cushion. An initial value of deflection can be measured before pressing. The initial value can be measured when the base plate has been formed and the vacuum has been generated in the vacuum cushion. The initial value can describe a rest position of the base plate. The deflection can be measured by a contact measurement or a non-contact measurement. The deflection can be a distance by which the base plate is deformed from its rest position by the compressive force. The deflection can be documented. After pressing, when the compressive force on the cell module has decreased, a sag of the base plate can be measured. The sag can be a permanent deformation of the base plate due to the overlying cellular module and/or a local compressive force in the thermal paste. The sag can also be documented. A manufacturing process can also be monitored via the deflection and/or the sag.

Furthermore, a device for establishing a heat transfer between components of a battery is presented, the device being adapted to execute, implement and/or control the method according to one of the preceding claims in corresponding devices.

For this purpose, the device may have, for example, a mechanical system with actuators or a robotics system with which the components of the battery can be displaced, in particular displaced relative to one another. Further, the vacuum cushion and a vacuum pump for generating a negative pressure in the cushion may be part of such a device. The device may further comprise a dispenser or similar device for applying the thermal paste. Finally, the device can have a control, by means of which functionalities of the aforementioned units of the device can be controlled in order to perform steps of the previously described method.

Further advantages features and details of the invention arise from the subsequent description of a preferred embodiment as well as from the drawings. The features and combinations of features mentioned above in the description, as well as the features and combinations of features shown in the description of the figure and/or in the figures alone are usable not only in the combination indicated in each case, but also in other combinations or on their own without leaving the scope of the invention.

BRIEF DESCRIPTION OF THE SEVERAL VIEWS OF THE DRAWINGS

Further advantages features and details of the various embodiments of this disclosure will become apparent from the ensuing description of a preferred exemplary embodiment or embodiments and further with the aid of the drawings. The features and combinations of features recited below in the description, as well as the features and feature combination shown after that in the drawing description or in the drawings alone, may be used not only in the particular combination recited but also in other combinations on their own without departing from the scope of the disclosure.

In the following, an advantageous example of the invention is explained with reference to the accompanying figures, showing.

DETAILED DESCRIPTION OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" should be understood as including only one of A, only one of B, only one of C, or any combination of A, B, and C.

The figures are merely schematic representations and serve only to explain the invention. Elements that are identical or have the same effect are marked with the same reference signs throughout.

For ease of understanding, the reference signs to FIGS. 1-4 are retained for reference in the following description.

Figure 1:
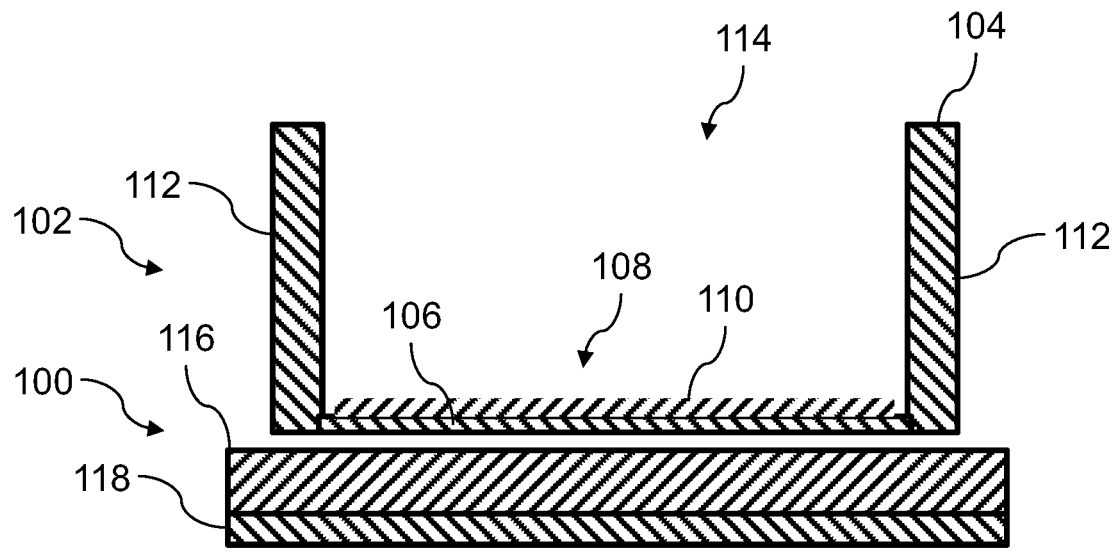
FIG. 1 shows a representation of a device according to an embodiment.

FIG. 1 shows an embodiment of a device 100 according to an embodiment for establishing heat transfer between components of a battery 102. Here, the first component 104 of the battery 102 is shown as a frame 104 of the battery 102. The frame 104 may also be referred to as the battery compartment of the battery 102. A thermal paste 110 is applied to a base plate 106 of the frame 104 in a section 108 thereof. Here, the thermal paste 110 is spaced from edges of the base plate 106. The thermal paste 110 may be referred to as a gap filler. The frame 104 is constructed of spars 112 that form, in particular, rectangular compartments 114. In this regard, the spars 112 are side walls of the compartments 114. For ease of illustration, the frame 104 shown here has only one compartment 114. Further compartments 114 may be arranged, for example, laterally adjacent to the compartment 114. The base plate 106 closes the compartment 114 downwardly. Thus, the base plate 106 forms a floor of the compartment 114. The base plate 106 connects the spars 112 to each other.

A vacuum cushion 116 is arranged under the frame 104 as a first component of the device 100. The vacuum cushion 116 changes its characteristics depending on a pressure in the vacuum cushion 116. If the pressure is substantially equal to an ambient pressure, that is, insignificantly greater than or equal to the ambient pressure, the vacuum cushion 116 can be plastically deformed. If the pressure is less than the ambient pressure, the vacuum cushion 116 hardens.

The vacuum cushion 116 has an elastic cover and a filling. For example, the filling consists of particles. If there is a correspondingly strong enough negative pressure in the vacuum cushion 116, the particles lie against each other and, in particular, exert a high resistance to pressure forces. Without the negative pressure, the particles are surrounded by air and slide off together. As a result, the vacuum cushion 116 can adapt to almost any contours. When the vacuum is generated, the molded contour is retained.

Here, the vacuum cushion 116 rests on a flat base 118 of the device 100. Due to gravity, a surface of the vacuum cushion 116 becomes approximately smooth when the external and internal pressures are balanced and there is no object resting on it, because the filling fills recesses and protrusions flow off to the sides.

In one embodiment, the thermal paste 110 has been applied to the base plate 106 in the form of caterpillars. The caterpillars run essentially parallel to each other.

Figure 2:
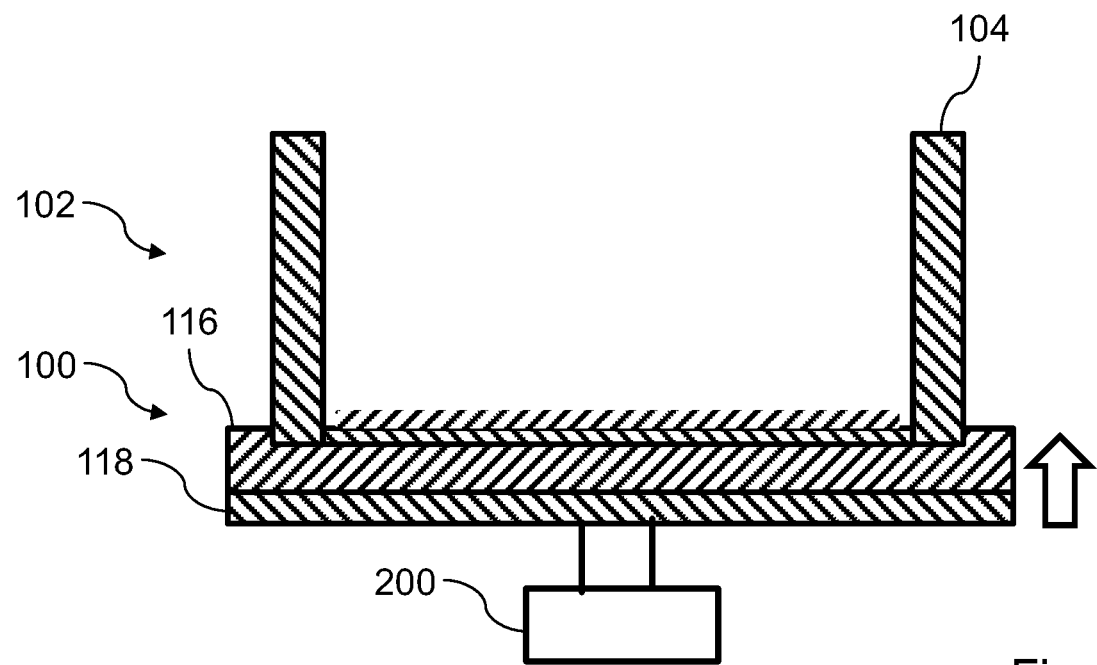
FIG. 2 shows a representation of placing a frame of a battery on a vacuum cushion of a device according to an embodiment.

FIG. 2 shows an illustration of placing a frame 104 of a battery 102 on a vacuum cushion 116 of a device 100, according to one embodiment. The illustration corresponds essentially to the illustration in FIG. 1. In contrast, the frame 104 here rests on the vacuum cushion 116 and a bottom surface of the base plate 106 is formed by the vacuum cushion. Due to the fluidity of its filling and the elasticity of its cover, the vacuum cushion 116 is in full contact with the base plate 106. In this regard, the frame 104 is recessed a portion of the way into the vacuum cushion 116. The base plate 106 now rests on the vacuum cushion 116 without stress, or at least with little stress.

Here, the vacuum cushion 116 with the base 118 has been pressed against the base plate 106 by a lifting device 200 of the device 100. Alternatively, the frame 104 may be lowered onto the vacuum cushion 116 by a lowering device.

In one embodiment, the base plate 106 includes a cooling device not shown here on the underside. The cooling device has cooling channels projecting above a main plane of extension of the underside. The cooling channels are similarly formed in three dimensions when the frame 104 is placed on the vacuum cushion 116.

Figure 3:
FIG. 3 shows a representation of generating a negative pressure on a device according to an embodiment.

FIG. 3 shows an illustration of a generation of a negative pressure at a device 100 according to an example embodiment. The illustration corresponds essentially to the illustration in FIG. 2. In addition to this, a vacuum pump 300 is symbolically shown herein to create a vacuum in the vacuum cushion 116 by extracting air from the vacuum cushion 116 and its filling. As a result of the negative pressure, the vacuum cushion 116 hardens and maintains the contour of the frame 104 lowered thereon. The vacuum pulls the cover of the vacuum cushion 116 together. In this process, the filling is compressed evenly from all sides and thus retains the shape of the base plate 106 created during placement.

Figure 4:
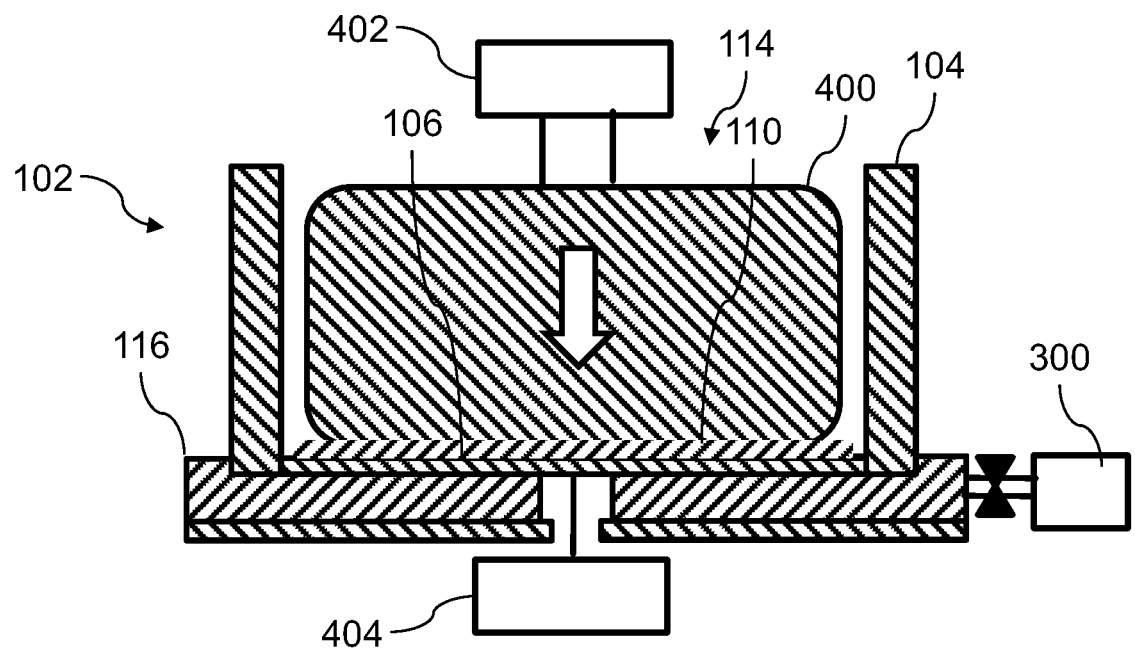
FIG. 4 shows an illustration of a pressing of a cell module into a thermal paste using a press device of an apparatus according to an embodiment.

FIG. 4 shows an illustration of a pressing of a cell module 400 into a thermal paste 110 using a press device 402 of a device 100 according to an example embodiment. The cell module 400 is a second component 400 of the battery 102. The illustration corresponds essentially to the illustration in FIG. 3. Additionally, here the cell module 400 is disposed in the compartment 114 and is pressed into the thermal paste 110 by the press device 402. Pressing can also be referred to as setting. During the pressing, the vacuum pump 300 is active or a valve between the vacuum cushion 116 and the vacuum pump 300 is closed and ensures the vacuum in the vacuum cushion 116. Thus, during spinning, the base plate 106 is supported over substantially its entire surface by the hardened vacuum cushion 116 so that any pressure in the thermal paste 110 resulting from the spinning cannot deform the base plate 106 or can only deform it insignificantly.

In one embodiment, the press device 402 is configured as a positioning device and includes a gripper for lifting and positioning the cell module 400. The gripper can also be designed as a multiple gripper. The multiple gripper can grip multiple cell modules 400 simultaneously, position them relative to each other, and insert them into the frame 104 at the correct position. In this regard, the cell modules 400 may be placed in the same compartment 114 of the frame 104 in a grouped manner or may be placed in multiple compartments 114 in a grouped manner or individually. Thus, the complete battery 102 can be assembled in one working cycle. Alternatively, the cell modules 400 may be positioned one after the other.

In one embodiment, the cell module 400 is screwed to the frame 104 after being pressed. The screw connection secures a position of the cell mode 400 relative to the frame 104. Tolerance compensation elements are used for screwing, for example to compensate for shape and position tolerances during the screwing process.

In one embodiment, the vacuum cushion 116 has a recess through which a measuring device 404 scans the base plate 106. The recess is disposed substantially centrally below the frame 104. The measuring device 404 detects a deflection of the base plate 106 when the cell module 400 is pressed against it, through the recess. In the area of the recess, the base plate 106 is not supported. The measuring device 404 may detect the deflection by contact or non-contact.

After pressing, the vacuum pump 300 is switched off and/or the valve is opened, allowing air to flow into the vacuum cushion 116. As a result, the vacuum cushion 116 softens again and the battery 102 can be easily lifted off the vacuum cushion 116.

In other words, FIG. 4 shows a contour support by means of a vacuum cushion. The vacuum cushion enables stabilization of the base plate of a battery system against deformation when placing the cell modules.

Up to now, a milled contour plate has been used as a base for setting the battery modules. This method is inexpensive but does not allow adaptation to tolerances of the base plate. To compensate for the tolerances, a matrix clamping system can be used which takes up the shape of the base plate.

The vacuum cushion is moved under the base frame and a vacuum is applied. The cell modules are placed in the base support on the base plate. The vacuum cushion absorbs the force acting on the base plate and distributes the force flat/laminar. After the cell modules have been screwed together, the cushion can be removed again.

The approach presented here solves a problem in battery manufacturing and is also applicable to future battery systems. The approach presented here can also be used for any other application that requires flexible contour-matched support. The approach presented here can reduce manufacturing tolerances and increase component quality. Investment costs can be reduced. A cycle time can be shortened because several cell modules can be set simultaneously.

The approach presented here is significantly cheaper than complex and expensive clamping systems. The vacuum cushion enables full-surface support under a cell module when the base plate is accurately molded. The approach is scalable. A complete battery system can be supported at once. Damage to the base plate, for example by scratching the lacquer, can be prevented because the cushion is made of plastic fabric. In series production, several cell modules can be set at the same time, which can reduce the cycle time in production.

In one embodiment, the vacuum cushion comprises a stable cushion filled with small plastic balls. For example, the plastic balls can have a diameter of three millimeters. Under ambient pressure, the balls can move and the cushion adapts to the contour of the component. As soon as the cushion is evacuated, the balls are compressed and a stable cushion is formed that can absorb high forces.

The battery system can be supported by a workpiece carrier. The battery system is constructed from an empty battery frame in which 12 cell modules are inserted. The battery frame has four compartments for three modules each. A gap filler is injected into this frame, which serves as a thermal conductive paste between the cell module and the base plate, which is equipped with a water-cooling system. Water cooling is provided by cooling channels at the bottom of the compartments to achieve effective cooling of the cell modules. After application, the gap filler is pressed into the frame by the cell module to ensure a two-dimensional connection. The vacuum cushion is pressed against the base plate from below until the contour is formed. The vacuum cushion is then evacuated and locked so that it can absorb the forces that occur when the gap filler is pressed. When grouting, up to approx. 150 kg can weigh on the vacuum cushion. For example, the vacuum bag can be made of polyethylene and plastic granulate. The cushion can have a recess in the middle of the cell module, through which a distance sensor can measure onto the base plate. Thus, the deflection of the base plate can be documented during the setting of the cell modules.

Since the devices and processes described in detail above are execution examples, they can be modified to a large extent in the usual way by a person skilled in the art without leaving the scope of the invention. In particular, the mechanical arrangements and the proportions of the individual elements in relation to each other have been chosen merely as examples.

Having described some aspects of the present disclosure in detail, it will be apparent that further modifications and variations are possible without departing from the scope of the disclosure. All matter contained in the above description and shown in the accompanying drawings shall be interpreted as illustrative and not in a limiting sense.

What is claimed is:

1. A method for producing a heat transfer between a base plate having a top surface and a bottom surface and at least one cell module of a battery, the method comprising the steps of:
   laterally distributing a thermal paste on the top surface,
   arranging a vacuum cushion proximate to the bottom surface,
   placing the base plate on a vacuum cushion such that the bottom surface plastically deforms the vacuum cushion;
   generating a negative pressure in the vacuum cushion so as to harden the vacuum cushion; and
   pressing the at least one cell module of the battery into the thermal paste while the base plate is supported by the vacuum cushion.

2. The method according to claim 1, wherein the vacuum cushion is configured such that an internal pressure is adjustable by an ambient pressure to soften the vacuum cushion when the frame is lifted off the vacuum cushion.

3. The method according to claim 1, wherein the step of laterally distributing further comprising the step of applying the thermal paste in a form of a caterpillar, and applying the caterpillar so as to be flattened when pressed.

4. The method according to claim 1, further comprising the step of applying the thermal paste to at least one section of the base plate.

5. The method according to claim 1, further comprising the step of arranging a cooling device between the base plate and the vacuum cushion, such that the cooling device is plastically shaped by the vacuum cushion.

6. The method according to claim 1, further comprising the step of at least one of bolting the cell module to the frame after the step of pressing and screwing the at least one cell module to the frame after the step of pressing.

7. The method according to claim 1, wherein the step of pressing further comprises the steps of pressing at least one additional cell module of the battery into the thermal paste.

8. The method according to claim 1, further comprising the step of detecting deflection of the base plate during the step of pressing.

* * * * *